US012568879B2

(12) United States Patent
Ding et al.

(10) Patent No.: US 12,568,879 B2
(45) Date of Patent: Mar. 10, 2026

(54) WORK VEHICLE

(71) Applicant: Globe (Jiangsu) Co., Ltd., Changzhou (CN)

(72) Inventors: Min Ding, Changzhou (CN); Qunli Wei, Changzhou (CN); Fei Zhu, Changzhou (CN); Chaoqun Wang, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 1114 days.

(21) Appl. No.: 17/557,055

(22) Filed: Dec. 21, 2021

(65) Prior Publication Data

US 2022/0201931 A1      Jun. 30, 2022

(30) Foreign Application Priority Data

Dec. 26, 2020   (CN) .......................... 202011570644.6
Dec. 26, 2020   (CN) .......................... 202023190565.0

(51) Int. Cl.
| | |
|---|---|
| *A01D 69/10* | (2006.01) |
| *A01D 34/00* | (2006.01) |
| *A01D 34/64* | (2006.01) |
| *A01D 34/82* | (2006.01) |
| *A01D 34/78* | (2006.01) |

(52) U.S. Cl.
CPC ........... *A01D 34/64* (2013.01); *A01D 34/006* (2013.01); *A01D 34/82* (2013.01); *A01D 34/78* (2013.01)

(58) Field of Classification Search
CPC ...... A01D 34/64; A01D 34/006; A01D 34/82; A01D 34/78; A01D 69/10; B60T 7/045; Y10T 74/20528; Y10T 74/20648
See application file for complete search history.

(56) References Cited

U.S. PATENT DOCUMENTS

| | | | | |
|---|---|---|---|---|
| 4,278,143 | A | 7/1981 | Nagai | |
| 6,889,791 | B2 * | 5/2005 | Watanabe | B60K 26/04 |
| | | | | 180/271 |
| 7,051,614 | B2 * | 5/2006 | Podkopayev | B60T 7/045 |
| | | | | 74/516 |
| 7,353,730 | B2 * | 4/2008 | Fujioka | G05G 5/06 |
| | | | | 74/575 |
| 9,387,835 | B2 * | 7/2016 | Pelletier | B60W 10/18 |
| 11,589,513 | B2 * | 2/2023 | Reese | A01D 34/64 |
| 11,944,039 | B2 * | 4/2024 | Wu | B60T 7/06 |
| 2004/0000444 | A1 * | 1/2004 | Watanabe | B60K 28/02 |
| | | | | 180/271 |
| 2005/0160868 | A1 * | 7/2005 | Podkopayev | G05G 1/46 |
| | | | | 74/512 |

(Continued)

FOREIGN PATENT DOCUMENTS

CN            110199685  A       9/2019

*Primary Examiner* — Thomas W Irvin

(57) ABSTRACT

The disclosure provides a work vehicle. The work vehicle includes: a frame, a wheel unit connected with the frame, a working unit connected with the frame, and a power source arranged on the frame to supply power. The work vehicle further includes: a brake assembly connected with the wheel unit, a locking assembly, provided with a lock arm to lock the brake assembly, and a starting mechanism. The starting mechanism includes a starting arm connected with the lock arm to drive the lock arm to move when the starting arm is operated to unlock the brake assembly.

17 Claims, 5 Drawing Sheets

(56) References Cited

U.S. PATENT DOCUMENTS

| | | | |
|---|---|---|---|
| 2006/0053952 A1* | 3/2006 | Fujioka | B60T 7/045 |
| | | | 74/527 |
| 2008/0229868 A1* | 9/2008 | Populaire | B60T 7/045 |
| | | | 74/512 |
| 2011/0023652 A1* | 2/2011 | Cosby | G05G 1/30 |
| | | | 74/513 |
| 2015/0232071 A1* | 8/2015 | Pelletier | B60W 10/18 |
| | | | 477/194 |
| 2020/0000039 A1* | 1/2020 | Reese | A01D 34/006 |
| 2021/0084821 A1* | 3/2021 | Wu | B60T 7/06 |
| 2024/0140371 A1* | 5/2024 | Takahashi | G05G 1/01 |

* cited by examiner

WORK VEHICLE

CROSS REFERENCE TO RELATED APPLICATION

The present application is based on, and claims the priority from, Chinese application number CN202011570644.6, filed on Dec. 26, 2020, and Chinese application number CN202023190565.0, filed on Dec. 26, 2020, the disclosure of which is hereby incorporated by reference herein in its entirety for all purposes.

TECHNICAL FIELD

The disclosure relates to a work vehicle, belonging to the field of garden tools.

BACKGROUND

The parking brake is one of the indispensable braking devices of the vehicle. The parking brake should ensure that the vehicle is parked on a slope that meets the requirements of the slope and will not slip.

Riding garden tools such as mowers and tractors are usually provided with a control device that controls the braking and the start-up acceleration of the whole machine. When the existing riding garden tool is started from the parking state, it is necessary to step on the brake pedal to release the riding garden tool from the parking state, and then step on the accelerator pedal. In this way, the riding garden tools can be driven normally, which is cumbersome in operation and cannot be started quickly. In addition, the control device of the existing riding garden tool has a complicated structure and is inconvenient to manufacture.

In view of this, it is indeed necessary to provide a control device and a mower with the control device to solve the problems mentioned above.

SUMMARY

The disclosure provides a work vehicle to realize rapid conversion between parking and driving.

The disclosure provides a work vehicle. The work vehicle includes: a frame, a wheel unit connected with the frame, a working unit connected with the frame, and a power source arranged on the frame to supply power. The work vehicle further includes: a brake assembly connected with the wheel unit, a locking assembly, and a starting mechanism. The locking assembly includes a lock arm to lock the brake assembly. The starting mechanism includes a starting arm connected with the lock arm to drive the lock arm to move when the starting arm is operated to unlock the brake assembly.

As a further improvement of the disclosure, the brake assembly includes a brake arm, a connecting portion and a brake wire, the connecting portion is connected with the brake arm and the brake wire is connected with the connecting portion to drive the brake wire to move through the brake arm.

As a further improvement of the disclosure, the connecting portion is provided with a limiting part matched with the locking assembly.

As a further improvement of the disclosure, the brake assembly further includes a brake switch which can be triggered by the connecting portion.

As a further improvement of the disclosure, the lock arm is provided with a locking part which can match with the limiting part.

As a further improvement of the disclosure, the starting mechanism includes an accelerator connected with the starting arm.

As a further improvement of the disclosure, the starting mechanism further includes a first reset mechanism to drive the starting arm to reset.

As a further improvement of the disclosure, the starting mechanism includes a starting arm. The locking assembly includes a lock arm for locking the brake assembly, and the lock arm is connected with the starting arm to drive the lock arm to move through the starting arm.

As a further improvement of the disclosure, the brake assembly includes a second reset mechanism to drive the brake assembly to reset.

As a further improvement of the disclosure, the locking assembly includes a third reset mechanism to drive the lock arm to reset.

As a further improvement of the disclosure, the work vehicle further includes a base for housing at least a part of the brake assembly and at least a part of the starting mechanism, and the base is provided with an opening for the brake arm and the starting arm to pass through.

As a further improvement of the disclosure, the starting arm is provided with a first pedal at one end outside the base, and the brake arm is provided with a second pedal at the other end outside the base.

As a further improvement of the disclosure, the work vehicle is a mower.

The disclosure provides a work vehicle. The work vehicle includes: a frame, a wheel unit connected with the frame, a working unit connected with the frame, and a power source arranged on the frame to supply power. The work vehicle further includes: a locking assembly; a brake assembly connected with the frame, when the brake assembly being operated to a position, the brake assembly is locked by the locking assembly; and a starting mechanism, configured to connect with the locking assembly, wherein when the starting mechanism is operated to move to a position, the locking assembly unlocks the brake assembly.

The disclosure provides a work vehicle. The work vehicle includes: a frame, a wheel unit connected with the frame, and a working unit connected with the frame. The work vehicle further includes: a brake assembly, provided with a second pedal, a locking assembly provided with a handle, and a starting mechanism provided with a first pedal. When the second pedal is stepped to a certain position, the wheel unit is in a braking state. When the handle is operated, the brake assembly is locked by the locking assembly, the brake assembly is in a locked state, and the wheel unit is locked in a braking state. When the brake assembly is in a locked state, the first pedal is stepped on, the locking assembly unlocks the brake assembly, and the wheel unit is unlocked.

The beneficial effects of the disclosure are: the disclosure utilizes the linkage of the starting mechanism and the locking assembly, so that the vehicle can run normally just by controlling the starting mechanism in the parking state, and can realize quick start-up. In addition, the control device of the disclosure has a simple structure and is convenient to manufacture.

DETAILED DESCRIPTION

In order to make the purpose, technical solutions and advantages of the disclosure clearer, the disclosure will be described in detail below with reference to the accompanying drawings and specific embodiments.

The disclosure provides a control device 200, the control device 200 can be set on garden tools (ie, vehicles) such as mowers, tractors and so on, so as to realize the control of parking and starting of the garden tools. Of course, the control device 200 can also be applied to other garden tools or electric tools to achieve parking and starting control, which will not be described in detail here, nor will it make any restrictions. For clarity of description, the following part of the specification will take the control device 200 applied to the mower 100 as an example to describe the specific structure of the control device 200 in detail.

Figure 1:
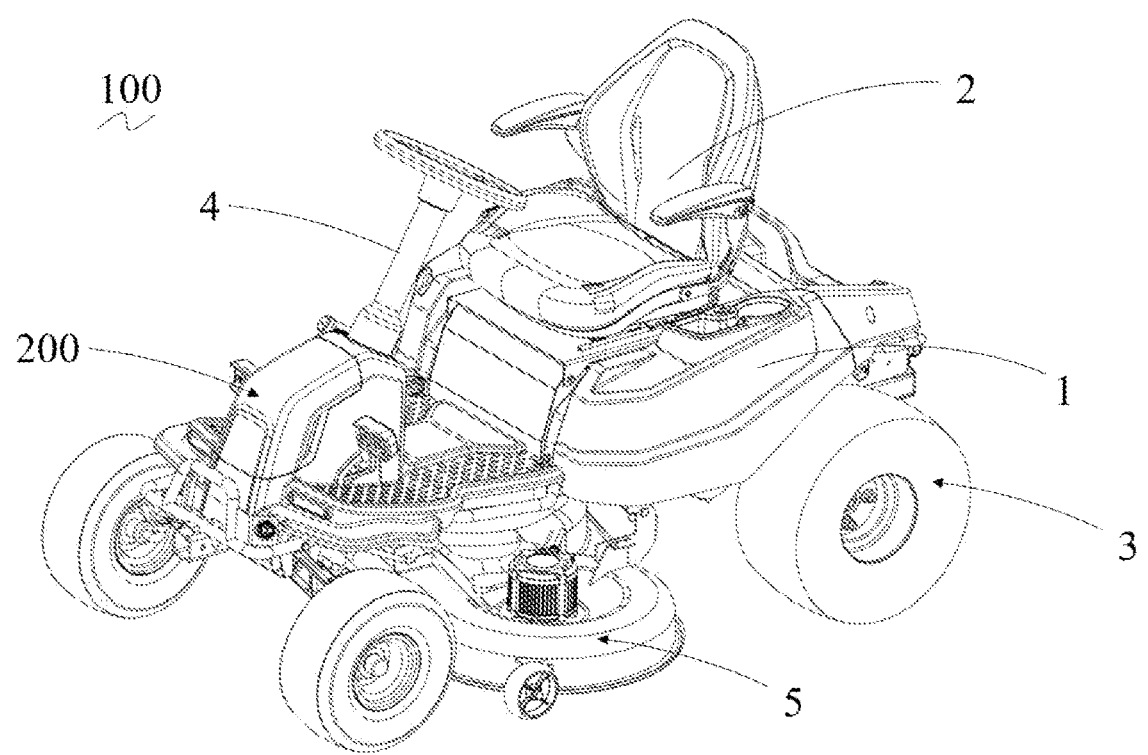
FIG. 1 is a perspective view of a mower of the disclosure.

As shown in FIG. 1, the disclosure provides a mower 100, the mower 100 includes a frame 1, a seat 2, a driving mechanism (not shown), a wheel unit 3, an operating mechanism 4, a power source and a working unit 5.

The seat 2 is installed on the frame 1 for the operator to sit on. The driving mechanism is connected to the frame 1 and used to drive the wheel unit 3 and the working unit 5 to be operated. In this embodiment, the driving mechanism includes a first motor for driving the wheel unit 3 to move and a second motor for driving the working unit 5 to work. The wheel unit 3 is used to drive the mower 100 to move. The wheel unit 3 of this embodiment specifically includes a pair of traveling wheels and a pair of driving wheels, and the pair of driving wheels can be driven by the first motor.

The operating mechanism 4 is arranged in front of the seat 2 for controlling the driving direction of the mower 100. In this embodiment, the operating mechanism 4 specifically includes a steering wheel assembly, through the steering wheel assembly the operator can control the direction of the traveling wheels, and then control the driving direction of the mower 100.

The working unit 5 includes a blade with mowing function. Preferably, there are two blades in this embodiment. Correspondingly, there are also two second motors to control the two blades to work respectively.

The power source is a battery assembly, and the battery assembly includes at least one battery for supplying power to the first motor, the second motor, and other electronic assemblies on the mower 100. Preferably, there are 6 batteries, and the battery can supply power for hand-held electric tools such as hedge trimmers, string trimmers, and so on. At the same time, the power source of this embodiment is arranged under the seat 2. This arrangement can improve the space utilization rate, lower the center of gravity, and make the mower 100 more stable. Of course, in other embodiments, the power source can also be an entire battery, instead of a combination of multiple batteries capable of supplying power to the hand-held electric tool.

Figure 2:
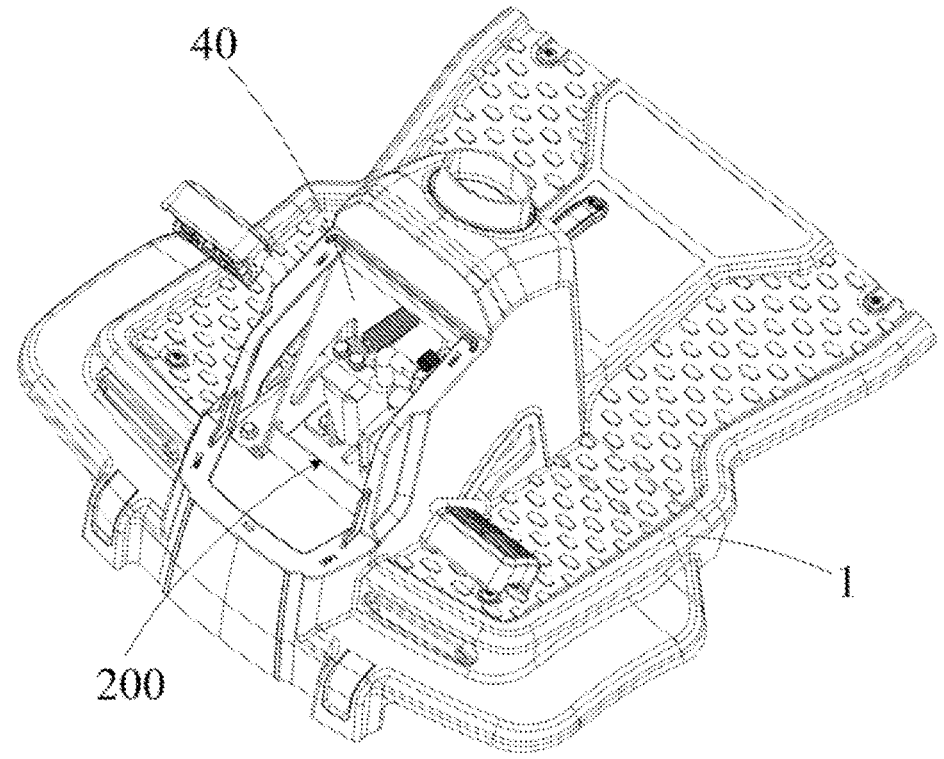
FIG. 2 is a schematic view of a control device of the disclosure arranged on a frame.
Figure 3:
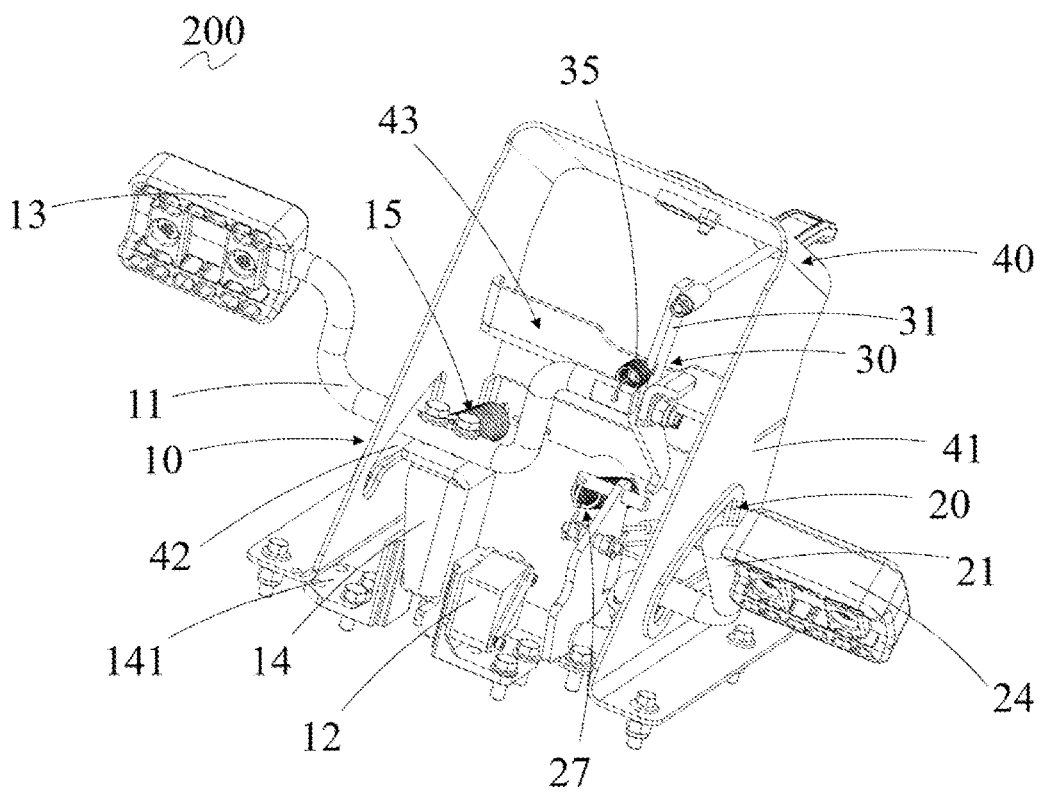
FIG. 3 is a perspective view of the control device of the disclosure.
Figure 4:
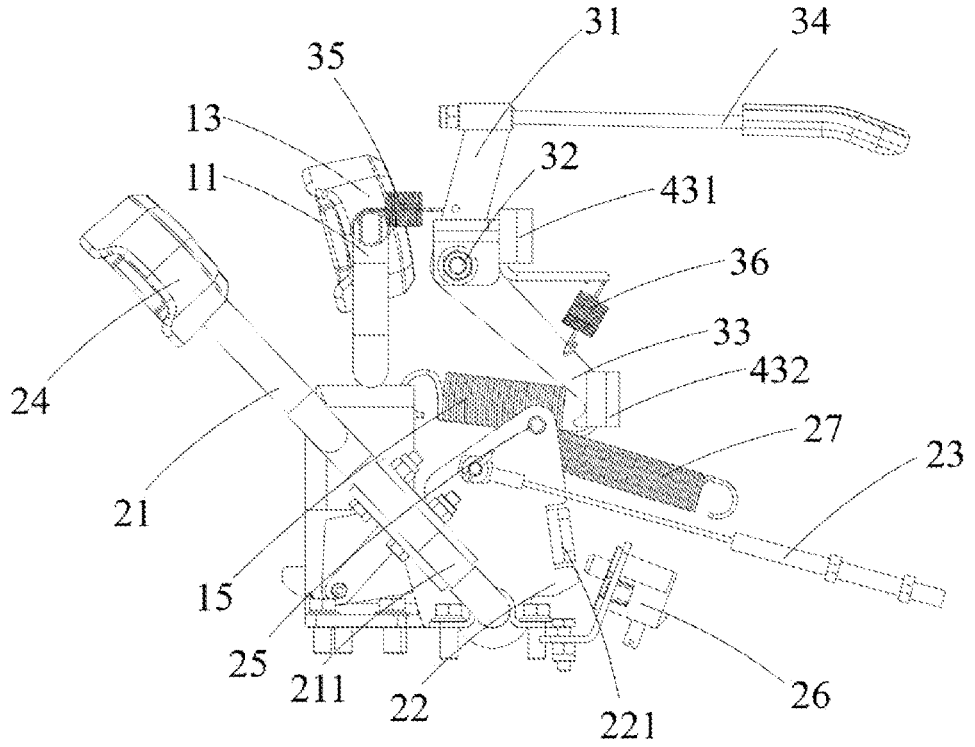
FIG. 4 is a side view of the control device of the disclosure.
Figure 5:
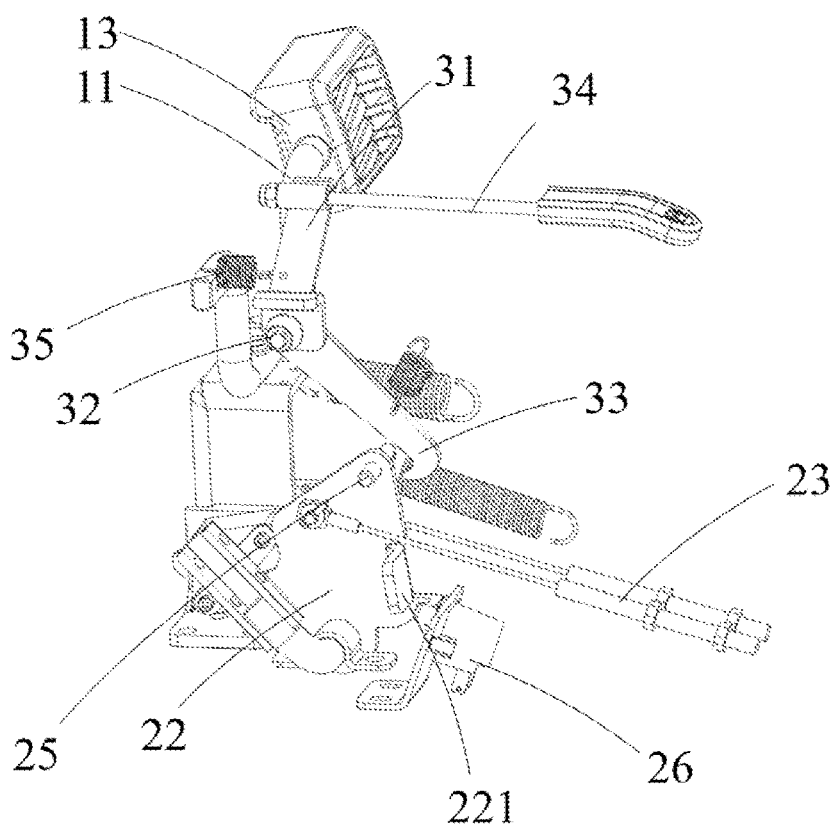
FIG. 5 is a partial schematic view of FIG. 3 after the base is removed.
Figure 6:
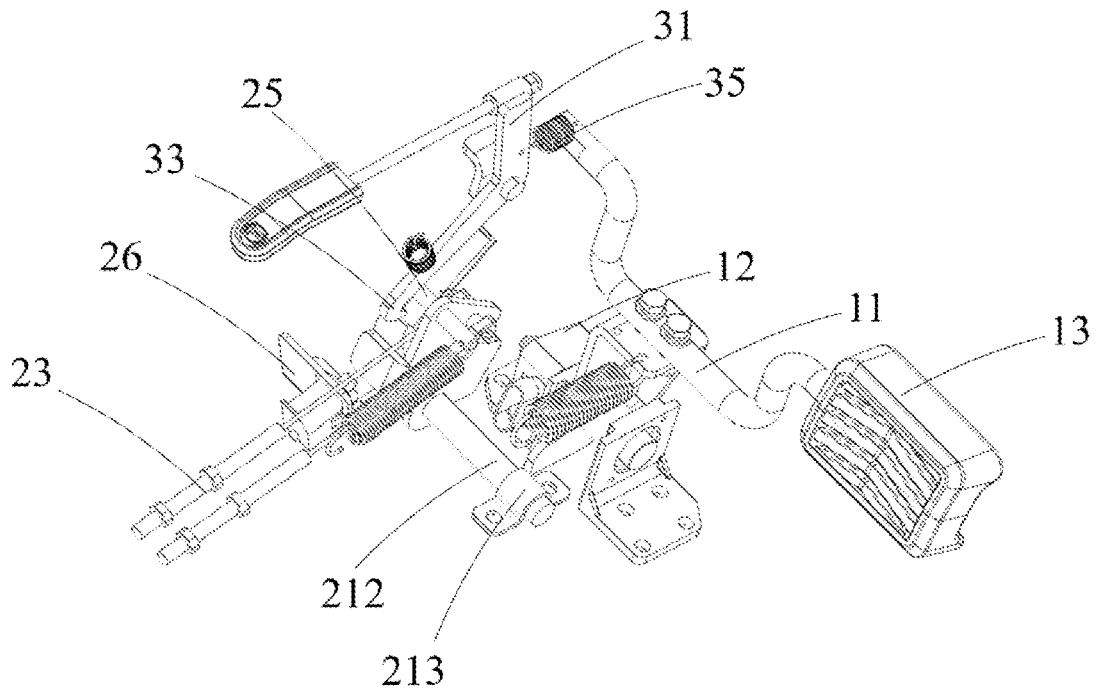
FIG. 6 is a schematic view from another angle of FIG. 5.
Figure 7:
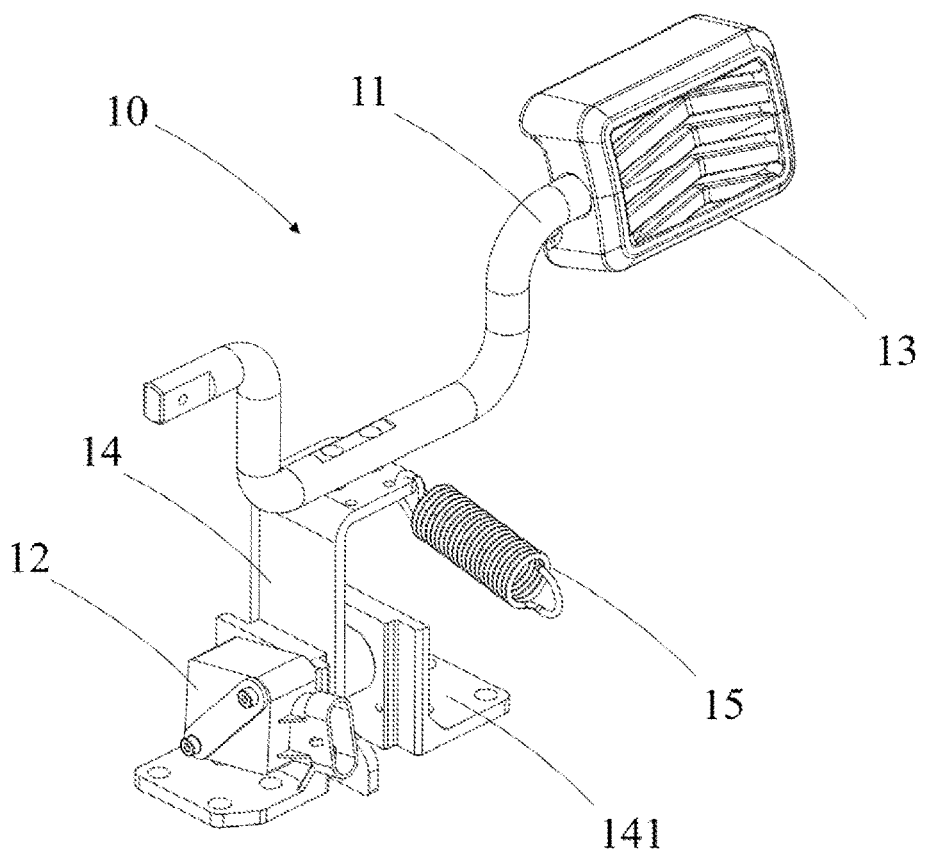
FIG. 7 is a schematic view of a starting mechanism in the control device of the disclosure.
Figure 8:
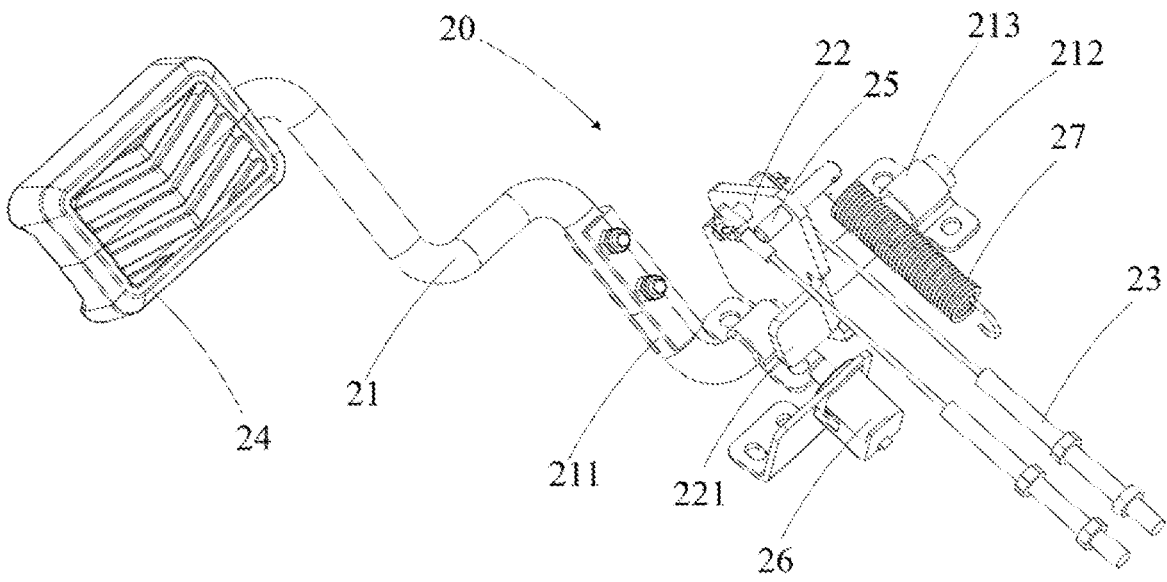
FIG. 8 is a schematic view of a brake assembly in the control device of the disclosures.
Figure 9:
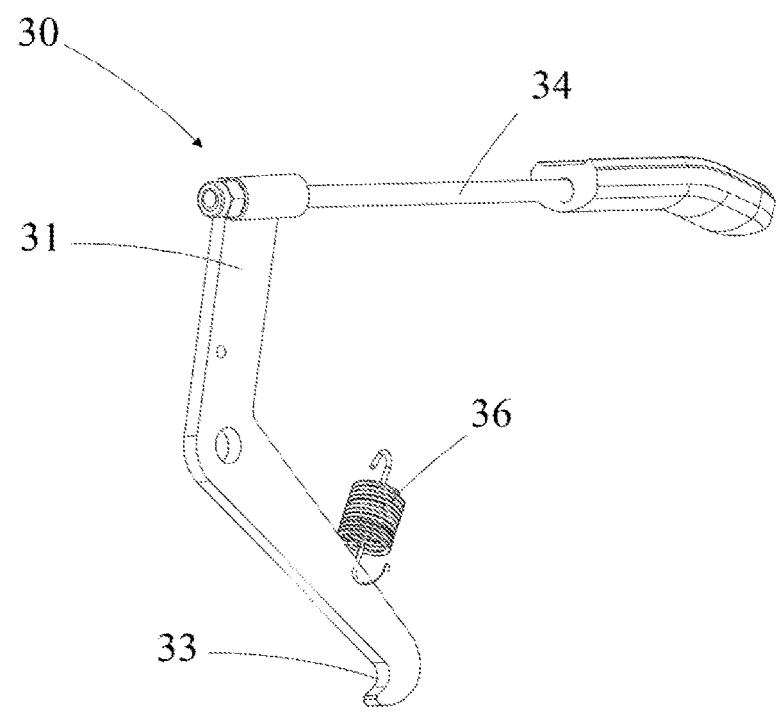
FIG. 9 is a schematic view of a locking assembly in the control device of the disclosures.
Figure 10:
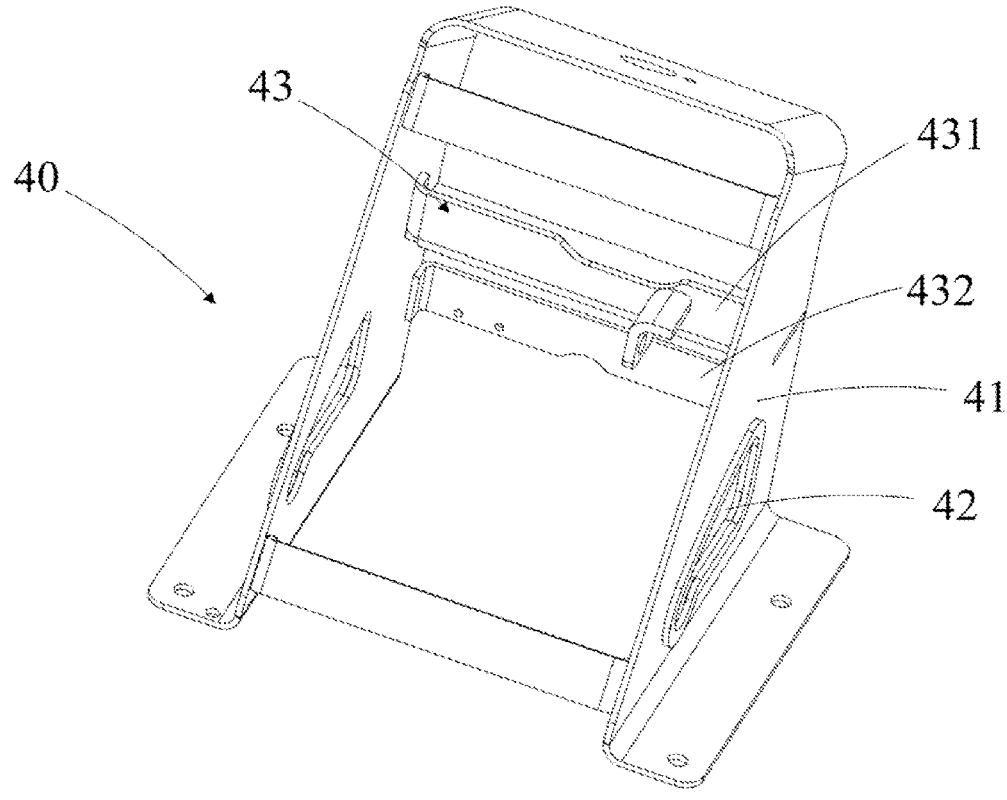
FIG. 10 is a schematic view of a base in the control device of the disclosures.

As shown in FIG. 2 and FIG. 3, the mower 100 of this embodiment further includes a control device 200, the control device 200 includes a brake mechanism for realizing the braking and parking of the mower 100, and a starting mechanism 10 for realizing the starting of the mower 100. Specifically, the brake mechanism includes a brake assembly 20 and a locking assembly 30, and the locking assembly 30 is used to lock the brake assembly 20 so that the mower 100 is in a parking state. When parking the mower, the brake assembly 20 first brakes the mower 100, and then the brake assembly 20 is locked in the parking state by the locking assembly 30, so that the mower 100 can be easily parked.

In a preferred embodiment of the disclosure, the starting mechanism 10 is connected to the locking assembly 30. When the starting mechanism 10 is activated, the starting mechanism 10 can drive the locking assembly 30 to unlock the brake assembly 20, so that the mower 100 can move. In the specific embodiment of the disclosure, the starting mechanism 10, the brake assembly 20 and the locking assembly 30 are respectively provided with a starting arm 11, a brake arm 21 and a lock arm 31 for respectively controlling the starting mechanism 10, the brake assembly 20 and the locking assembly 30.

The starting mechanism 10 includes a starting arm 11 movably arranged and an accelerator 12 connected to the starting arm 11. The accelerator 12 is used for controlling the mower 100 to walk; one end of the starting arm 11 is connected to the accelerator 12, and the other end is provided with a first pedal 13 for a foot operation; the starting arm 11 is controlled to generate a mechanical action by stepping on the first pedal 13; and the mechanical signal can be converted into an electrical signal by the accelerator 12 so as to control the mower 100 to start and perform a corresponding action.

The starting arm 11 can swing relative to the frame 1. Specifically, the starting arm 11 is connected to the frame 1 through a bracket 14. The starting arm 11 is connected to the bracket 14, and the bracket 14 is rotatably connected with the frame 1. When the first pedal 13 is stepped on, the first pedal 13 drives the starting arm 11 to move, and the starting arm 11 drives the bracket 14 to rotate relative to the frame 1. More specifically, the bracket 14 is rotatably connected to the frame 1 through a mounting base 141, the mounting base 141 is fixedly connected with the frame 1, and one end of the bracket 14 is rotatably connected to the mounting base 141. At the same time, the accelerator 12 is fixedly connected with the mounting base 141, and the accelerator 12 is connected to the bracket 14. The starting arm 11 is connected with the accelerator 12 through the bracket 14. When the starting arm 11 moves, the bracket 14 is driven to move, so that the accelerator 12 recognizes the mechanical movement and generates an electrical signal to control the action of the mower 100 accordingly. As a preferred solution, an angle sensor is provided in the accelerator 12 of this embodiment, and when the bracket 14 rotates, the angle sensor detects the rotation information and then generates a corresponding signal. Of course, other types of sensors can also be provided in the accelerator 12, which is no limited here. Since the accelerator 12 is a technology known to those skilled in the art, its specific structure will not be repeated here.

The starting mechanism 10 further includes a first reset mechanism 15 for driving the starting arm 11 to reset. When the external force applied to the starting arm 11 is removed, the starting arm 11 can return to the initial position by the first reset mechanism 15.

Furthermore, the brake assembly 20 includes a brake arm 21, a connecting portion 22 and a brake wire 23. One end of the brake arm 21 is connected with the frame 1, and can rotate relative to the frame 1. The connecting portion 22 is connected with the brake arm 21 and moves synchronously with the brake arm 21. One end of the brake wire 23 is connected to the connecting portion 22, and the other end is connected to the wheel unit 3 of the mower 100. When the brake arm 21 changes and rotates relative to the frame 1, the brake arm 21 synchronously drives the connecting portion 22 to move, and then pulls the brake wire 23 connected with the connecting portion 22, so as to brake the wheel unit 3 to realize braking.

As a preferred solution, the brake arm 21 includes a horizontally arranged movable part 212 and a connecting part 211 vertically connected with the movable part 212. The movable part 212 is arranged on the frame 1 and can only be rotated in a horizontal direction. The other end of the connecting part 211 is provided with a second pedal 24 so that the brake arm 21 can rotate around the movable part 212. Specifically, the second pedal 24 is preferably fixed to the brake arm 21 by screws, and the movable part 212 is rotatably connected to the frame 1 through a fixed connecting member 213. At the same time, the connecting portion 22 is preferably fixedly connected with the movable part 212 by welding, so that the connecting portion 22 and the movable part 212 rotate synchronously.

In this embodiment, the connecting portion 22 is vertically arranged and connected with the brake arm 21 and the brake wire 23. When the brake arm 21 moves, the brake arm 21 drives the connecting portion 22 to swing, and then pulls the brake wire 23 to tension for braking.

The connecting portion 22 is further provided with a limiting part 25 for matching with the locking assembly 30. The limiting part 25 is protrudingly arranged, and the limiting part 25 protrudes from the surface of the connecting portion 22 so as to match with the locking assembly 30. Specifically, the limiting part 25 is preferably cylindrical.

The brake assembly 20 further includes a brake switch 26 for controlling the start of the brake. The brake switch 26 is fixed on the frame 1, and the brake switch 26 can be connected or separated from the connecting portion 22 mentioned above. When the brake arm 21 is not operated, which means that the mower 100 is in an unbraked state, the connecting portion 22 controls the brake switch 26 to be in an on state. At this time, the wheel unit 3 of the mower 100 is in an unbraked state. When the brake arm 21 is operated, which means that the mower 100 is in a braking state, the connecting portion 22 controls the brake switch 26 to be in an off state. At this time, the wheel unit 3 of the mower 100 is in a braking state. Specifically, when the brake arm 21 is not operated, the connecting portion 22 touches the brake switch 26, so that the brake switch 26 is in an on state. When the brake arm 21 is operated to brake, the brake arm 21 drives the connecting portion 22 to swing toward the side away from the brake switch 26, and the connecting portion 22 is separated from the brake switch 26, so that the brake switch 26 is in an off state. The brake switch 26 is connected to the driving mechanism, in this embodiment, the brake switch 26 is connected to the driving mechanism by a controller. When the brake switch 26 is turned off, the brake switch 26 enables the mower 100 to control the first motor to lock, and the first motor stops running, so that the driving wheels of the wheel unit 3 stop walking.

Preferably, the connecting portion 22 is further provided with a touching part 221 connected to the connecting portion 22, and the touching part 221 is used to increase the contact area with the brake switch 26, so that the brake switch 26 can be triggered more accurately during operation. In this embodiment, the touching part 221 is arranged perpendicular to the connecting portion 22 and has a touching surface capable of contacting the brake switch 26. The touching part 221 can be integrally formed with the connecting portion 22 or can be a separate component connected with the connecting portion 22. Of course, the connection manner of the connecting portion 22 and the brake switch 26 includes but is not limited to the above structure, as long as it can be triggered during the rotation of the connecting portion 22, the structure is not limited here.

Similarly, the brake assembly 20 further includes a second reset mechanism 27 for driving the brake assembly 20 to reset. When the external force applied to the brake assembly 20 is removed, the second reset mechanism 27 drives the brake assembly 20 to return to the initial position. In the initial position, the brake wire 23 is in a state where the wheel unit 3 is not braked. In this embodiment, the second reset mechanism 27 is preferably connected with the limiting part 25, so that the brake assembly 20 can be reset more smoothly and with less effort. At the same time, the second reset mechanism 27 is arranged to be connected with the limiting part 25. When the brake assembly 20 and the locking assembly 30 are locked in matching, the brake assembly 20 and the locking assembly 30 can match more closely and reliably under the action of the second reset mechanism 27.

Furthermore, the locking assembly 30 includes a lock arm 31. The lock arm 31 is provided with a movable bolt 32 for fixing the lock arm 31, and the lock arm 31 can rotate around the movable bolt 32. The lock arm 31 is provided with a locking part 33, which is used to match with the limiting part 25, which means when the brake assembly 20 being operated to a certain position, the brake assembly 20 can locked by the locking assembly 30, so that the mower 100 can be locked to the parked state by the locking assembly 30. When parking the mower, first operate the brake arm 21, and the brake arm 21 will drive the connecting portion 22 to move to a certain position for braking. At this time, the lock arm 31 is operated to allow the locking part 33 of the lock arm 31 match with the limiting part 25 of the connecting portion 22. The lock arm 31 will lock the connecting portion 22 at this position, and the brake wire 23 will always be in the state of braking the wheel unit 3, so that the mower 100 realizes the parking. Preferably, the locking part 33 is hook-shaped, so as to clamp the column-shaped limiting part 25.

The lock arm 31 is connected with a handle 34 for operating the lock arm 31. Specifically, the handle 34 is fixed to an end of the lock arm 31 away from the locking part 33 preferably by a fastener such as a bolt.

It can be seen from the above that the starting mechanism 10 is connected with the locking assembly 30. Specifically, in this embodiment, the lock arm 31 of the locking assembly 30 is connected to the starting mechanism 10, and the lock arm 31 is connected with the starting arm 11 of the starting mechanism 10. When the starting arm 11 is operated, the starting arm 11 will drive the lock arm 31 to move, which causes the locking part 33 to be separated from the limiting part 25 and unlocking the brake assembly 20. Preferably, the starting arm 11 and the lock arm 31 are connected by an elastic component 35, and the matching of the locking part 33 and the limiting part 25 can be released by controlling the starting arm 11, so that the brake arm 21 is reset. The specific connection position of the elastic component 35 can be set as required, which is not limited here. Of course, the elastic component 35 can be a spring or other elastic devices, which is not limited here. In another embodiment of the disclosure, the starting arm 11 and the lock arm 31 can be connected by a connecting arm (not shown).

In a preferred embodiment of the disclosure, the locking part 33 and the elastic component 35 are respectively arranged at both ends of the lock arm 31 relative to the movable bolt 32, so that when the starting arm 11 is operated, the other end can be driven to move through the linkage of one end of the lock arm 31. Of course, in other embodiments of the disclosure, the locking part 33 and the elastic component 35 can be arranged at the same end of the lock arm 31, which is not limited here.

The locking assembly 30 includes a third reset mechanism 36 for driving the locking assembly 30 to reset. The third reset mechanism 36 is connected with the lock arm 31. When the external force applied on the locking assembly 30 is removed, the third reset mechanism 36 drives the locking assembly 30 to return to the initial position. In the initial position, the locking assembly 30 does not match with the brake assembly 20.

The control device 200 further includes a base 40. At least part of the brake mechanism and at least part of the starting mechanism 10 are housed in the base. Specifically, the base 40 is fixed to the frame 1 preferably by bolts or other fasteners. The base 40 includes a pair of baffles 41 arranged opposite to each other on the left and right. The pair of baffles 41 are respectively provided with an opening 42 for the brake arm 21 and the starting arm 11 to move, the brake arm 21 and the starting arm 11 respectively extend through the openings 42 to the outside of the base 40 for operation. In addition, the opening 42 can also limit the range of movement of the brake arm 21 and the starting arm 11 to a certain extent. The lock arm 31 is preferably rotatably connected with the base 40, and the lock arm 31 is preferably arranged vertically and can rotate in a vertical plane.

The base 40 includes a set of connecting plates 43. In this embodiment, the set of connecting plates 43 is connected with the pair of baffles 41, and the set of connecting plates 43 includes a first connecting plate 431 and a second connecting plate 432. The lock arm 31 is rotatably connected with the base 40 through the first connecting plate 431.

The first reset mechanism 15, second reset mechanism 27, and third reset mechanism 36 are preferably tension springs. One end of the first reset mechanism 15 is connected with the starting mechanism 10, and the other end is connected to the second connecting plate 432 of the base 40. More preferably, one end of the first reset mechanism 15 is connected to the bracket 14 of the starting mechanism 10, and the first reset mechanism 15 drives the bracket 14 to reset, so as to drive the starting arm 11 to reset. One end of the second reset mechanism 27 is connected with the limiting part 25, the other end is connected with the frame 1, and the second reset mechanism 27 is set as a spring so that the brake assembly 20 can always maintain the trend of reset, which cause the brake assembly 20 being tightly matched with the locking assembly 30. One end of the third reset mechanism 36 is connected with the lock arm 31, and the other end is connected with the first connecting plate 431. Of course, in other embodiments, the first reset mechanism 15, the second reset mechanism 27, and the third reset mechanism 36 can also be with other structures and other connection methods.

In the actual operation process, first step on the second pedal 24 to drive the brake arm 21 to rotate relative to the frame 1, and then drive the connecting portion 22 to move. The connecting portion 22 is separated from the brake switch 26, the brake switch 26 is switched off, and the first motor for driving the wheel unit 3 is locked. In addition, the brake wire 23 is pulled to brake the wheel unit 3. At this time, the lock arm 31 is driven by the handle 34 until the locking part 33 of the lock arm 31 matches with the limiting part 25 on the connecting portion 22, so that the brake assembly 20 can be locked. In this way, the mower 100 realizes brake parking. At this time, the starting arm 11 is maintained at the initial position under the action of the first reset mechanism 15, which means, the mower 100 is maintained in a non-starting acceleration state. When it is necessary to start the mower 100 to make the mower move, step on the first pedal 13 directly to drive the starting arm 11 to move. Since the lock arm 31 is connected with the starting arm 11, when the starting arm 11 moves, the starting arm 11 will pull the lock arm 31 through the elastic component 35 to rotate the lock arm 31, so that the locking part 33 of the lock arm 31 is separated from the limiting part 25 on the connecting portion 22. At this time, since no external force acts on the second pedal 24, the brake arm 21 returns to the position under the action of the second reset mechanism 27, and then the brake wire 23 is released. At the same time, the connecting portion 22 touches the brake switch 26, the brake switch 26 is turned on, the first motor for driving the wheel unit 3 is released from the locked state, and the mower 100 is released from the parking state. At this time, due to the action of the starting arm 11, the accelerator 12 correspondingly generates a signal to control the mower 100 to move, and the lock arm 31 returns to the position under the action of the third reset mechanism 36. In this way, the control device 200 of this embodiment does not need to manually unlock the brake mechanism first, and it is sufficient to directly operate the start mechanism 10, which realizes the rapid conversion of the parking the mower.

In summary, the disclosure utilizes the linkage of the starting mechanism 10 and the locking assembly 30 to realize that the vehicle can be driven normally only by manipulating the starting mechanism 10 in a parked state, which realizes a quick start. In addition, the control device 200 of the disclosure has a simple structure and is convenient to manufacture.

The above embodiments are only used to illustrate the technical solution of the disclosure and not to limit it. Although the disclosure is described in detail with reference to the preferred embodiments, those of ordinary skill in the art should understand that the technical solution of the disclosure can be modified or replaced without departing from the spirit and scope of the technical solution of the disclosure.

What is claimed is:

1. A work vehicle, comprising:

a frame, a wheel unit connected with the frame, a working unit connected with the frame, and a power source arranged on the frame to supply power, wherein the work vehicle further comprises:

a brake assembly connected with the wheel unit, a locking assembly, comprising a lock arm to lock the brake assembly, and a starting mechanism, comprising a starting arm connected with the lock arm to drive the lock arm to move when the starting arm is operated to unlock the brake assembly;

wherein, the brake assembly comprises a brake arm, a connecting portion, a brake wire and a brake switch, the brake switch is capable of being triggered by the connecting portion, a touching part is arranged on the connecting portion and configured to increase a contact area of the connecting portion and the brake switch, the brake switch is connected to a driving mechanism of the work vehicle, and when the brake switch is turned off, the brake switch is configured to lock a motor for driving the wheel unit and stop the work vehicle from moving.

2. The work vehicle according to claim 1, wherein the connecting portion is connected with the brake arm and the brake wire is connected with the connecting portion to drive the brake wire to move through the brake arm.

3. The work vehicle according to claim 2, wherein the connecting portion is provided with a limiting part matched with the locking assembly.

4. The work vehicle according to claim 3, wherein the lock arm is provided with a locking part capable of matching with the limiting part.

5. The work vehicle according to claim 4, wherein the starting mechanism comprises an accelerator connected with the starting arm.

6. The work vehicle according to claim 5, wherein the starting mechanism further comprises a first reset mechanism to drive the starting arm to reset.

7. The work vehicle according to claim 5, further comprises a base for housing at least a part of the brake assembly and at least a part of the starting mechanism, wherein the base is provided with an opening for the brake arm and the starting arm to pass through.

8. The work vehicle according to claim 7, wherein the starting arm is provided with a first pedal at a first end outside the base, and the brake arm is provided with a second pedal at the other a second end outside the base.

9. The work vehicle according to claim 8, wherein the second pedal is configured to drive the brake arm to rotate relative to the frame, and then drive the connecting portion to move so as to enable the connecting portion to be separated from the brake switch and switch off the brake switch, the brake wire is configured to brake the wheel unit, and the lock arm is driven by a handle until the locking part of the lock arm matches the limiting part on the connecting portion so as to lock the brake assembly and brake the work vehicle.

10. The work vehicle according to claim 9, wherein the lock arm and the starting arm are connected through an elastic component so as to drive the lock arm to move through the starting arm, the first pedal is configured to drive the starting arm to move so as to pull the lock arm through the elastic component to rotate the lock arm, then the locking part of the lock arm is separated from the limiting part on the connecting portion, the brake arm returns to a reset position and the brake wire is released, and then the connecting portion is configured to touch the brake switch to turn on the brake switch so as to release the motor for driving the wheel unit from a locked state and release the work vehicle.

11. The work vehicle according to claim 1, wherein the lock arm and the starting arm are connected through an elastic component so as to drive the lock arm to move through the starting arm.

12. The work vehicle according to claim 11, wherein the brake assembly comprises a second reset mechanism to drive the brake assembly to reset.

13. The work vehicle according to claim 12, wherein the locking assembly comprises a third reset mechanism to drive the lock arm to reset.

14. The work vehicle according to claim 1, wherein the work vehicle is a mower.

15. The work vehicle according to claim 1, wherein the brake arm is provided with a second pedal, the second pedal is configured to drive the brake arm to rotate relative to the frame, and then drive the connecting portion to move so as to enable the connecting portion to be separated from the brake switch and switch off the brake switch, the brake wire is configured to brake the wheel unit, and the lock arm is driven by a handle until the lock arm coupled with the connecting portion so as to lock the brake assembly and brake the work vehicle.

16. A work vehicle, comprising:
a frame,
a wheel unit connected with the frame,
a working unit connected with the frame, and
a power source arranged on the frame to supply power, wherein
the work vehicle further comprises:
a locking assembly,
a brake assembly connected with the frame, wherein when the brake assembly is operated to a position, the brake assembly is locked by the locking assembly, and
a starting mechanism, configured to connect with the locking assembly, wherein
when the starting mechanism is operated to move to a position, the locking assembly unlocks the brake assembly;
wherein, the brake assembly further comprises a connection portion and a brake switch, the brake switch is capable of being triggered by the connection portion, a touching part is arranged on the connecting portion and configured to increase a contact area of the connecting portion and the brake switch, the brake switch is connected to a driving mechanism of the work vehicle, and when the brake switch is turned off, the brake switch is configured to lock a motor for driving the wheel unit and stop the work vehicle from moving.

17. A work vehicle, comprising:
a frame,
a wheel unit connected with the frame, and
a working unit connected with the frame, wherein
the work vehicle further comprises:
a brake assembly, provided with a second pedal, wherein when the second pedal is stepped to a certain position, the wheel unit is in a braking state;
a locking assembly comprising a handle, wherein when the handle is operated, the brake assembly is locked by the locking assembly, the brake assembly is in a locked state, and the wheel unit is locked in a braking state, and
a starting mechanism, provided with a first pedal, wherein when the brake assembly is in a locked state, the first pedal is stepped on, the locking assembly unlocks the brake assembly, and the wheel unit is unlocked;

wherein, the brake assembly comprises a brake arm, a connecting portion, a brake wire and a brake switch, the brake switch is capable of being triggered by the connecting portion, a touching part is arranged on the connecting portion and configured to increase a contact area of the connecting portion and the brake switch, the brake switch is connected to a driving mechanism of the work vehicle, and when the brake switch is turned off, the brake switch is configured to lock a motor for driving the wheel unit and stop the work vehicle from moving.

\* \* \* \* \*